Jan. 23, 1934. P. A. E. ARMSTRONG Re. 19,058

PROCESS OF MAKING FERROUS PRODUCTS FACED WITH STABLE SURFACE ALLOYS

Original Filed March 30, 1929

INVENTOR
Percy A. E. Armstrong
BY
Dyke, Holden and Schaines
ATTORNEY

Reissued Jan. 23, 1934

Re. 19,058

UNITED STATES PATENT OFFICE 19,058

PROCESS OF MAKING FERROUS PRODUCTS FACED WITH STABLE SURFACE ALLOYS

Percy A. E. Armstrong, New York, N. Y.

Original No. 1,813,654, dated July 7, 1931, Serial No. 351,314, March 30, 1929. Application for reissue February 3, 1932. Serial No. 590,761

4 Claims. (Cl. 29—189)

My invention is of a process for making ferrous products with welded faces of stable surface alloy material.

My present invention is a continuation in part of my application Serial No. 63,975, filed October 21, 1925.

According to the present invention, ferrous metal is welded to a thin sheet of stable surface alloy by casting the ferrous metal against such a thin sheet of stable surface alloy, and by thereafter subjecting the resulting welded product to hot mechanical working, such as hot rolling, for example, with the ferrous surfaces in contact, a product is obtained with an inner portion of ferrous metal and outer surfaces of stable surface alloy on its opposite sides.

In the accompanying drawing, I have illustrated a preferable mode of casting the ferrous material against and thereby welding it to a stable alloy material preparatory to the final step of hot mechanical working, as hot rolling, to produce the final product.

Figure 1:
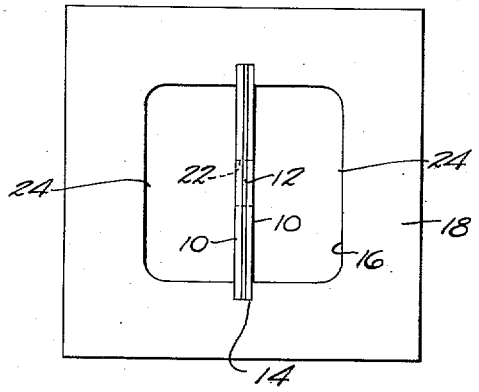
Fig. 1 is a plan view of an ingot mold with stable surface material therein, prior to casting.
Figure 2:
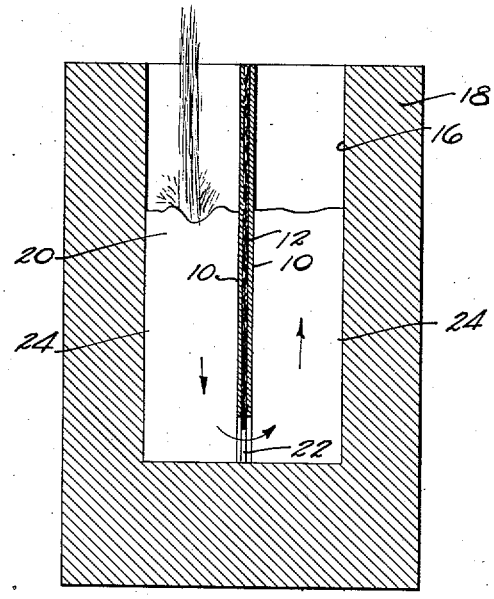
Fig. 2 is a vertical section of the ingot mold during casting of the ferrous metal.

In the showing selected for illustration, two thin sheets 10, 10 of stable surface material are placed back to back, with preferably a layer of asbestos 12 therebetween, and same inserted in slots 14, 14, forming substantially central extensions of the ingot cavity 16 in the ingot mold 18. The slots 14, 14 not only will serve to hold the sheets upright in the mold but will also serve to hold the sheets together so that when molten metal is poured around them, such molten metal will only contact with the outside faces and not penetrate up between the sheets. This is a matter of particular importance in the case of stainless steels, for due to the well-known quality of these steels of being slow to transmit heat, there is a great tendency for the sheets to warp when the molten metal is first poured against them, and this of course is particularly true when the sheets are made very thin as in the case of my invention. It is to be noted that in view of the relative thickness of the sheets 10, 10 as compared to the mold to be cast against them, preheating of these sheets is not essential.

Molten ferrous metal 20 when poured into the ingot mold at one side of the partition so formed passes in part through the hole 22 formed in the stable surface alloy sheets and the asbestos at preferably the lower central portion thereof, so that a part of the resulting ingot is top poured and the other part is bottom poured. Such shrinking of the cast material as takes place during cooling tends to cause the ferrous metal to shrink upon and against the stable surface alloy sections arranged in the interior of the mold, and to avoid any effect of shrinking away therefrom.

Figure 3:
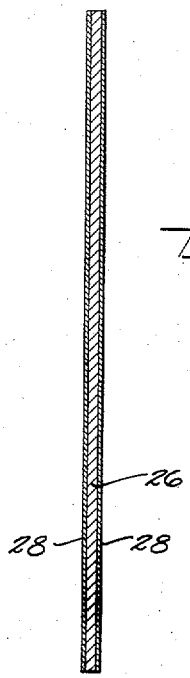
Fig. 3 is a section of the final rolled product.

The resulting ingot is separated into two parts on the parting plane produced by the asbestos layer, and when hot rolled, with the sides 24, 24 of the ferrous metal arranged in contact with one another and the stable surface alloy faces looking outwardly and adapted for coming in contact with the roll surface, the ferrous metal is welded into a substantially homogeneous interior portion, producing the final product shown in Fig. 3 and comprising the interior portion 26 of ferrous metal, having outer opposite face or surface portions 28, 28 of stable surface alloy material. The faces 24, 24 of the ferrous metal that are to be contacted may be machined smooth, or pickled before the composite element is subjected to hot rolling. This facilitates getting a good weld. The ingot parts may be separately rolled or otherwise hot worked into billet or bar form if desired, before being assembled in pairs as described for the final hot rolling.

The ratio of the thickness of the cast backing material to the thickness of the stable surface facing welded thereto in casting is to a considerable extent dependent upon the thickness desired for the finished rolled-down product. In general, this ratio is less for the production of very thin sheets than for the production of thicker sheets, since with the former a larger proportion of the sheet thickness must be made up of the stable surface layers in order to prevent exposure of the backing in the course of working, drawing, etc., for the production of articles, particularly cupped articles, therefrom, and in the ordinary uses and wear to which the articles are subjected. With thicker sheets relatively more of the cross-section may be made up of the backing material without danger of exposure of the backing material in the event of slight mechanical wear.

The cross-sectional area of the cast metal is preferably more than three times, and more preferably over five times, the cross-sectional area of the solid sheet against which same is cast. With a ratio of cast backing material to the solid plate of surfacing material which is materially under 3:1, the weld is generally poor and unduly high temperatures have to be used for the molten metal, which may result in porous ingots, ingot cracks and heavy shrinkage. With the production of relatively thicker finished products the ratio above referred to may be advantageously 5:1 or higher, and with such relation between the cast metal and the solid metal sheet inserted in the ingot mold, good welds can be produced without the use of unduly high heat for the molten material.

Various stable surface alloys may be used, as for example so-called rustless steel or iron with about 7–30% of chromium and with various other alloying materials. The choice of ferrous material to be cast against and welded to the sheets of stable surfacing material will depend upon requirements, but for general purposes carbon steel of .05% to 1% of carbon gives good results.

The rolled metal faced with welded surfaces of stable surface alloy can be used for various products and articles of which a few are, for example, sheets, roofings, conductor pipe conduits, shingles, cooking utensils, containers for foodstuffs, and articles for taking the place of tinware, zincware and plated articles generally.

I claim:

1. Process of making sheets of ferrous metal faced on opposite surfaces with stable surface alloy which consists in casting ferrous metal against solid stable surface alloy material in relatively thin sections such that the thickness of the alloy is not more than one-third the thickness of the ferrous metal cast against it, and subjecting the resulting welded product to hot mechanical working in pairs with the ferrous surfaces arranged in contact and the stable surfaces faces directed outwardly.

2. Process of making sheets of ferrous metal faced on opposite surfaces with welded surface portions of stable surface alloy, which comprises arranging relatively thin sections of solid stable surface material back to back in an ingot mold, casting ferrous metal between the insert and the mold walls, separating the resulting ingot parts, each comprising a ferrous metal part and a stable surface alloy part welded thereto in casting, and reversing same to bring the ferrous surfaces into contact and the stable surface alloy facing outwardly on opposite sides, and subjecting to hot mechanical work, as by hot rolling, whereby the ferrous metal part is welded into a homogeneous interior portion and same is faced on its opposite sides with welded thin surface portions of stable surface alloy material.

3. The method of making faced metal sheets which comprises preparing two thin sheets of a stable surface ferrous alloy, putting separating material between the sheets, positioning the sheets in an ingot mold and positively holding the sheets together so as to prevent the ingress of molten metal between them, casting ferrous metal around such sheets of a thickness of at least about three times the thickness of such sheets, permitting such cast metal to shrink around and against the sheets, whereby an ingot is formed adapted to be separated into two parts, and thereafter separating and hot working such ingot parts.

4. The process of making sheets of ferrous metal faced with stable surface alloy which comprises preparing two sheets of stable surface alloy, positioning them in a mold with a separating material between them, positively holding the edges of such sheets together and casting ferrous metal on both sides thereof simultaneously, with the metal on both sides interconnected so that the cast metal on cooling will shrink upon and against the stable surface alloy sheets, whereby an ingot is formed adapted to be separated into two parts, and thereafter submitting such ingot parts to the operations of separation and hot working.

PERCY A. E. ARMSTRONG.